UNITED STATES PATENT OFFICE.

OTTO SCHOTT, OF JENA, GERMANY, ASSIGNOR TO THE FIRM OF SCHOTT & GEN., OF JENA, GERMANY.

COMPOSITION FOR MAKING GLASS.

1,130,767.  Specification of Letters Patent.  Patented Mar. 9, 1915.

No Drawing.  Application filed September 12, 1912. Serial No. 719,977.

*To all whom it may concern:*

Be it known that I, OTTO SCHOTT, a citizen of the German Empire, residing at Jena, Germany, have invented a new and useful Composition for Making Glass, of which the following is a specification.

By the invention a kind of glass is realized, which considerably surpasses in its capacity of resisting chemical action the well-known kinds of glass of about the same cost of production and of the same general applicability. In consequence of this property the new kind of glass is particularly suitable for chemical apparatus and for gage-glasses.

In the kind of glass according to the present invention at least 50 per cent. of silicic acid is made use of as in well-known kinds of glass. Besides the said silicic acid the new glass further contains alumina 4 to 15 per cent., lime 3 to 11 per cent., boracic acid 5 to 15 per cent. and alkali 4 to 14 per cent. The percentage of alumina and lime together however must amount to not less than half and not more than five times the percentage of the boracic acid. While no other glass-forming components are employed for the new kind of glass, of course the addition of a small quantity of one or more other substances having some such secondary purpose as a coloring of the glass is not excluded.

Soda is suitable as the alkaline component. According to the experience gained, when working out the invention, the new kind of glass displays a particularly great capacity of resisting chemical action, when in the choice of the amount of soda and of the amount of alumina these amounts are kept well within the limits given above, *i. e.*, when with a proportion of soda of 8 to 12 per cent. not less than about 6, but also not more than about 12 per cent. of alumina are taken.

I claim:

1. Glass containing at least 50 per cent. silicic acid and having as its other glass forming components alumina 4 to 15 per cent., lime 3 to 11 per cent., boracic acid 5 to 15 per cent. and alkali 4 to 14 per cent., the total percentage of alumina and lime being at least half and at most five times that of the boracic acid.

2. Glass containing at least 50 per cent. silicic acid and having as its other glass forming components alumina 6 to 12 per cent., lime 3 to 11 per cent., boracic acid 5 to 15 per cent. and soda 8 to 12 per cent., the total percentage of alumina and lime being at least half and at most five times that of the boracic acid.

OTTO SCHOTT.

Witnesses:
  PAUL KRÜGER,
  RICHARD HAHN.